(12) United States Patent
Crusius

(10) Patent No.: US 6,915,483 B1
(45) Date of Patent: Jul. 5, 2005

(54) METHOD FOR GENERATING A GROUP OF PAGE FILES FORMATTED IN A PAGE MARKUP LANGUAGE

(75) Inventor: Friedbert Crusius, München (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/341,207

(22) PCT Filed: Feb. 11, 1998

(86) PCT No.: PCT/DE98/00380

§ 371 (c)(1),
(2), (4) Date: Jul. 7, 1999

(87) PCT Pub. No.: WO98/36367

PCT Pub. Date: Aug. 20, 1998

(30) Foreign Application Priority Data

Feb. 13, 1997 (DE) .......................................... 197 05 526

(51) Int. Cl.$^7$ ............................................... G06F 17/21
(52) U.S. Cl. ..................... 715/513; 715/501.1; 715/530
(58) Field of Search .............................. 707/513, 501.1, 707/530; 715/513, 501.1, 530

(56) References Cited

U.S. PATENT DOCUMENTS 5,890,170 A * 3/1999 Sidana ..................... 715/501.1
5,907,837 A * 5/1999 Ferrel et al. .................... 707/3
5,918,237 A * 6/1999 Montalbano ............. 707/500.1
5,987,480 A * 11/1999 Donohue et al. ........ 715/501.1
6,018,748 A * 1/2000 Smith ...................... 707/501.1
6,112,242 A * 8/2000 Jois et al. ..................... 707/10
6,151,609 A * 11/2000 Truong ....................... 707/505
6,199,082 B1 * 3/2001 Ferrel et al. ................ 715/522
6,230,173 B1 * 5/2001 Ferrel et al. ............. 707/501.1
6,424,981 B1 * 7/2002 Isaac et al. ............. 707/501.1

OTHER PUBLICATIONS

IEEE 1996, Jian Hu et al, "Webin Tool: A generic Web to Database Interface Building Tool", pp. 285–290.
IEEE 1996, Yew–Huey Liu et al, "A Distributed Web Server and Its Performance Analysis on Multiple Platforms", pp. 665–672.
Web–Publisher, 1996, Dusan Zivadinovic, Katzengold: Netscape Navigator Gold Beta 2, pp. 112–113.

* cited by examiner

*Primary Examiner*—Joseph Feild
*Assistant Examiner*—Almari Yuan
(74) *Attorney, Agent, or Firm*—Schiff Hardin LLP

(57) ABSTRACT

When drawing up a hierarchically structured document in an author file, a reference to a data record of a file already stored in the authoring system can be generated. The author file is sub-classified into individual data records which are respectively stored as pages on an internet server. The added reference is converted into an HTML page address.

10 Claims, 4 Drawing Sheets

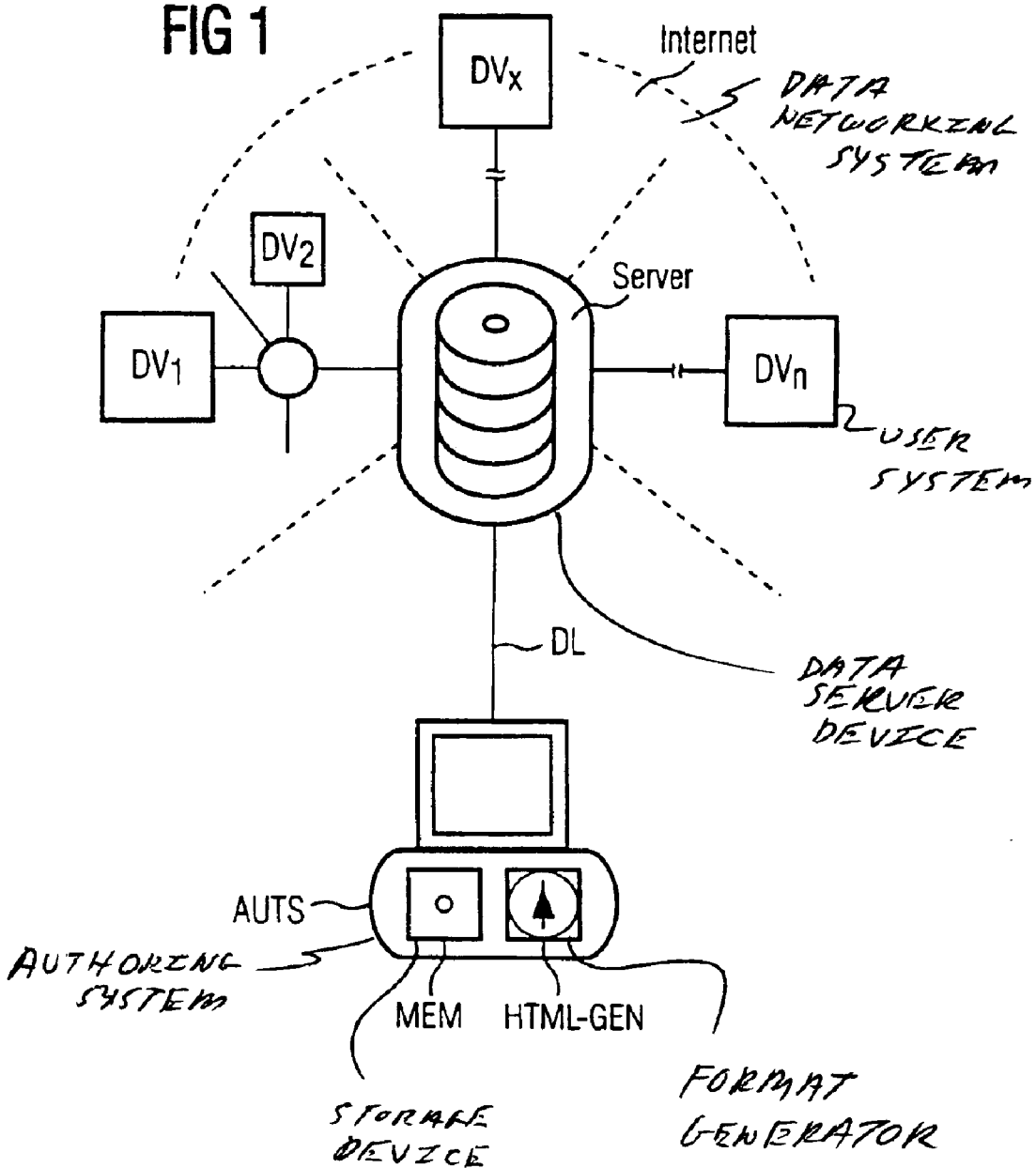

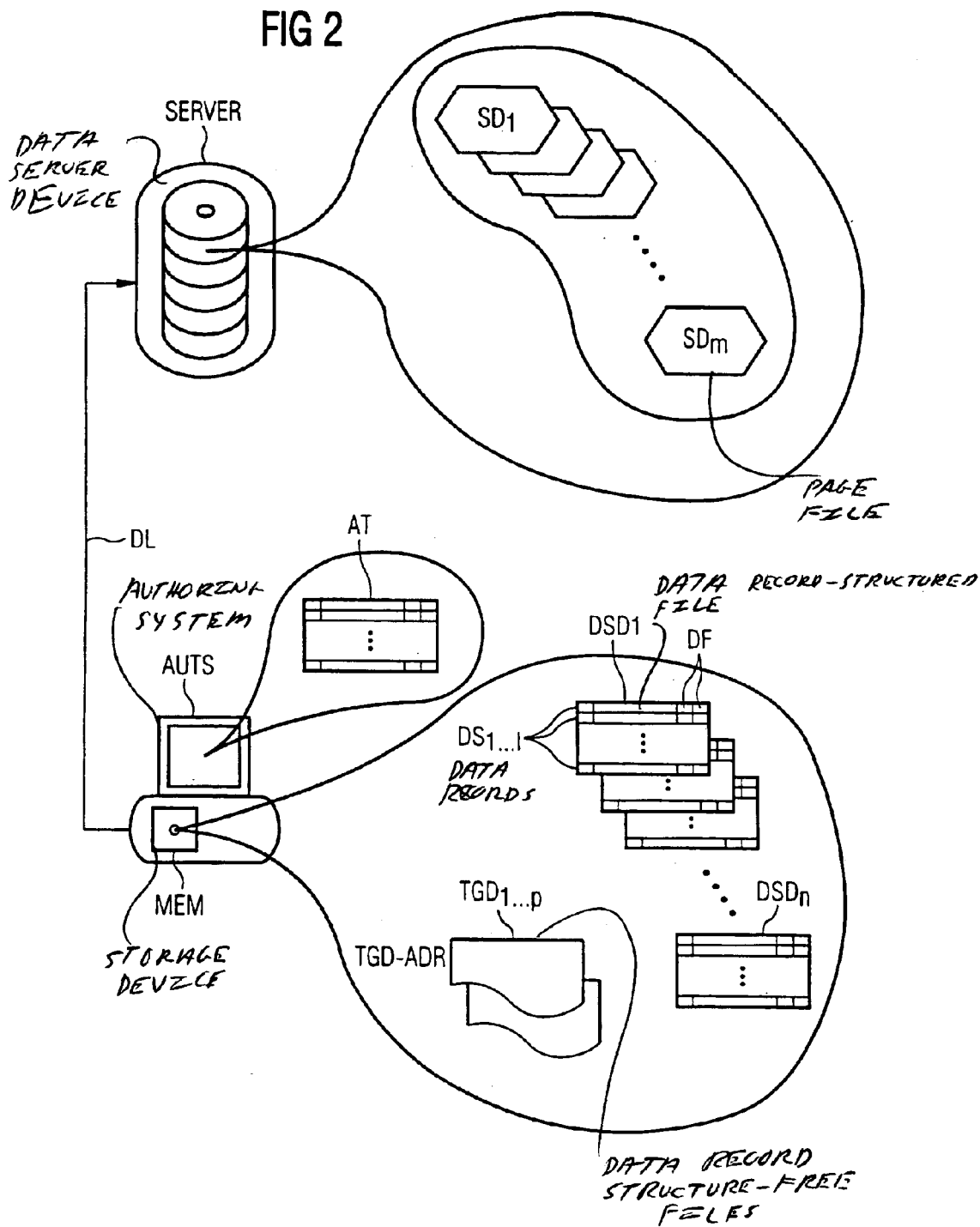

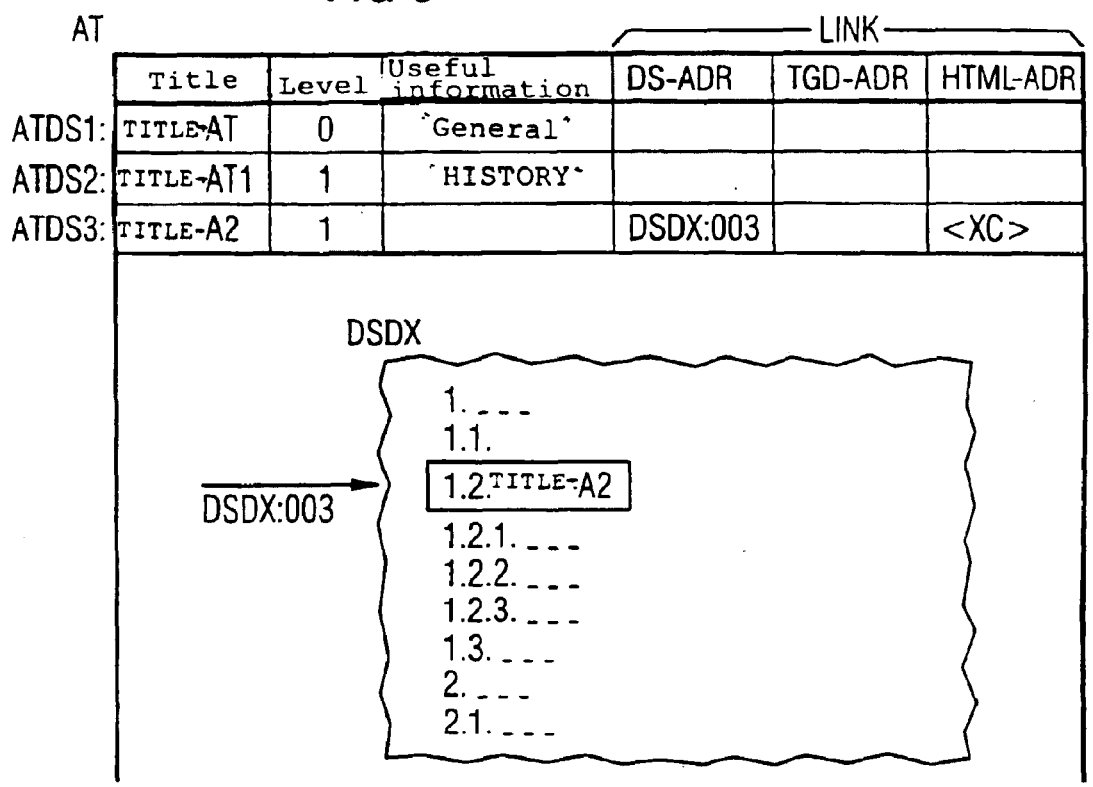

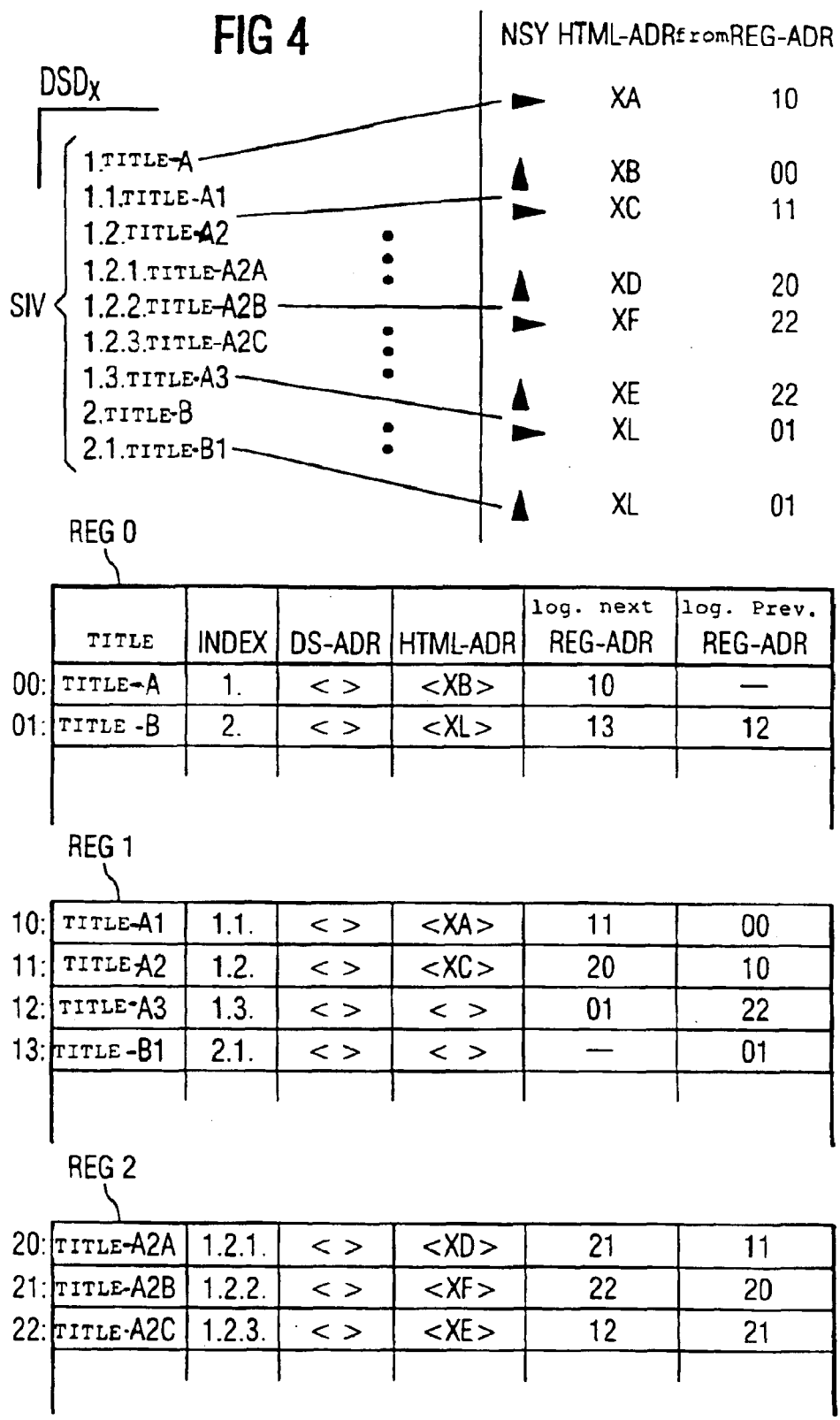

METHOD FOR GENERATING A GROUP OF PAGE FILES FORMATTED IN A PAGE MARKUP LANGUAGE

BACKGROUND OF THE INVENTION

The drawing up as well as the maintaining and availability of information, in particular of information relating to system processes and their illustration and logging, are gaining increasing importance primarily in the field of industry. In the scope of so-called management systems with which all product-related processes and structures in a plant or organization unit are defined, it is necessary to be able to make changes in existing processes, in their sequencing in their structuring as well as in control systems and subject descriptions in the most uncomplicated possible way, and to make the changed or freshly drawn up paperwork available as a document for all co-workers.

It is generally regarded as advantageous in this context if, when a new document is being drawn up, it is possible to resort to existing documentation or parts thereof. For example, documentation describing generally applicable regulations, defining standardized procedures or procedures specific to operating systems, or containing a similar representations which have already been drawn up, may be or need to be contained in a new document.

In order to meet these requirements and in order, in particular, to make changed or newly drawn up documents available to the relevant individuals as quickly as possible, information collation and storage supported by data processing techniques as well as data transmission via a private, for example in-house data network have been proposed.

SUMMARY OF THE INVENTION

The object of the present invention is to provide a method with whose aid a structured document can be drawn up from existing documentation and made available to the greatest possible number of individuals while placing little demand on the data network and requiring little storage capacity.

In general terms the present invention is a method for generating a group of page files formatted in a page markup language, for storage in a data server device of a data networking system through which the page files can be addressed by a multiplicity of data processing (DP) user systems and can be transferred to them.

A data record structured author file is drawn up on a DP authoring system which can be connected tot he data server device via a data transmission line. Author file text and graphic information can be edited within a respective data record and reference information can be added about data records of data record-structured files which can be addressed in the data processing authoring system. The author file is sent to a format generator device of the DP authoring system. An associated page file is in each case generated in the page markup language (HTML) from the data records of the author file and from the data records which belong to the data record-structured files and are marked by reference information. A page markup language-specific link control address addressing the page file associated with the marked data record is generated in each case from reference information added to the data records and is stored in the page file associated with the data record containing the reference information. The page files generated in this way and provided with page markup language-specific link control addresses are transmitted to the data server device via the data transmission line.

Advantageous developments of the present invention are as follows.

Reference information about other data records of data record-structured files which can be addressed in the DP authoring system can be added to data records of the data record-structured files which can be addressed in the DP authoring system.

Reference information about other data records of the data record-structured author file can be added to data records of the data record-structured author file.

The author file is a data record-structured file which can already be addressed,in the DP authoring system.

An item of reference information about files structured free of data records which can be addressed in the DP authoring system can be added.

The information stored in data record-structured files is subdivided into information modules to which at least one individual structure address is assigned. Each information module is stored together with its individual structure address in a respective data record. An item of reference information about a data record of a reference file is added in that, by means of visualization of the structure addresses filed in the reference file, it is possible to make a selection of one of the structure addresses.

When selecting a data record already stored in the data server device as a page file, a page markup language-specific link control address addressing this page file is generated and is temporarily stored in a data field of the data record holding the reference information.

The structure address is an item of text information or an item of numerical information.

A data record-structured file in the DP authoring system can be addressed only if the page files assigned to its data records are already stored in the data server device. A page file is transmitted only if it is not yet stored or a change has been made to its information content, in particular of link control addresses.

The stored page files are displayed in the DP user systems with navigation control fields which allow leafing through the group of page files tot he logically next or preceding page file while avoiding activation of corresponding forward functions of a page access device.

One essential advantage of the present invention, amongst others, consists in the physical separation of the original data drawn up by the author from the recovered data made available to the user via the data networking system. This means, in particular, that the original data cannot be overwritten by a user. The method according to the invention also allows optimum control over access rights between author and user.

Another advantage of the method according to the invention can be found in that, through the decoupling of original data and recovered data, the format generator device acts as a coupling component which makes it possible to use different hardware platforms as a basis and provides substantial independence from particular hardware characteristics.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a schematic representation of a data networking system with a data server device;

FIG. 2 shows a symbolic representation of files stored in an authoring system and in a server device;

FIG. 3 shows relevant data fields for drawing up an author file;

FIG. 4 shows a register drawn up by a format generator device for a file, in particular to determine navigation control addresses.

DESCRIPTION OF THE PREFERRED EMBODIMENTS

FIG. 1 gives a greatly simplified symbolic representation of a data networking system INTERNET. A multiplicity of DP user systems DV1, . . . DVn can be connected directly, or with the interconnection of other data networking systems, to a data server device SERVER; likewise, a DP authoring system AUTS is connected via a data transmission line DL to the data server device SERVER. The Internet/Intranet system used worldwide is employed as the data networking system.

In the data server device SEVER, a great deal of documentation is stored, each item being divided into so-called pages. Documentation stored in the data server device SERVER can be addressed by all DP user systems DV1, . . . , DVn linked to it through, i.e. connected up to, the data networking system INTERNET.

To view documented information on the DP user systems DV1, . . . ,DVn, page access devices, so-called browsers, are required on the latter which perform interpretation of control instructions contained in the pages and deliver—in accordance with the control instructions—the useful content to a display device of the DP user system. The pages are drawn up in a page markup language, e.g. the known web language HTML, whose formatting options essentially indicate what status a subset of information within a respective page has. The page markup language also makes it possible, with the aid of a so-called tag put in a page, to indicate links (i.e. addresses) to other pages of the documentation.

The DP authoring system AUTS which, like the individual DP user systems DV1, . . . ,DVn, is formed by a personal computer contains—as essential components for the present invention—a storage device MEM and a format generator device HTML-GEN technically embodied at the programming level.

For the DP authoring system AUTS, a so-called "Home page" has been filed in the data server device SERVER, which serves as a point of reference for all documentation coming from the DP authoring system AUTS and is used by the DP user systems DV1, . . . ,DVn as an entry address for access to the documentation drawn up by the DP authoring system AUTS.

Conventionally, the "Home page" links to a list of contents in which the individual documentation or their lists of contents are indicated. On each of the DP user systems DV1, . . . ,DVn, with the aid of a conventional browser, it is possible to turn over via the list of contents from one page to the next or to a different page, which moreover requires relatively long waiting times and through which the networking system becomes heavily loaded.

More detailed information about the Internet/Intranet, the web language HTML, about browsers and other devices known in connection with the data networking system "Internet" can be found in the relevant literature, e.g. Russ Jones, Adrian Nye, "HTML und das World Wide Web" [HTML and the Worldwide Web], O'Reilly & Associates, Bonn, 1995.

In FIG. 2, the data server device SERVER with its storage medium and the DP authoring system AUTS with its storage device MEM are symbolically represented. Page files SD1, . . . ,Sdm which are stored in HTML format in the storage medium of the data server device SERVER are also illustrated. Likewise symbolically represented are data record-structured files DSD1, . . . ,DSDn which are stored in the storage device MEM. Each of the data record-structured files consists of a multiplicity of data records DS1, . . . ,DS1 which, for their part, are subdivided into data fields DF. The data record-structured files DSD1, . . . ,DSDn are also to be regarded as databases or database modules. As well as these data record-structured files, data record structure-free files TGD1, . . . ,TGDp which are not data record-structured or have a data record structure which differs from the chosen structure of the data record-structured files DSD1, . . . , DSDn are also stored in the storage device MEM. In particular, the data record structure-free files TGD1, . . . , TGDp may contain purely verbal and/or graphical documentation.

The figure also symbolically represents a data record-structured author file AT whose structure corresponds to that of the data record-structured files DSD1, . . . ,DSDn. The author file AT is drawn up on the DP authoring system AUTS and is, of course, also stored, in particular temporarily stored, in the storage device MEM.

For each data record DS1, . . . ,DS1 of the data record-structured files DSD1, . . . DSDn, there is, in the storage medium of the data server device SERVER. an associated page which will be referred to below as page files SD1, . . . , Sdm. In the DP authoring system AUTS, it is possible to gain read and write access to each data record DS1, . . . ,DS1 with the aid of an individual data record address DS-ADR which identifies the data record file and, in the latter, the relevant data record. The page files SD1, . . . ,SDm have an individual HTML address HTML-ADR under which they can, in the data networking system or in the data server device SERVER, be addressed, i.e. found.

FIG. 3 illustrates the way in which an author file AT is drawn up on the DP authoring system AUTS with the aid of data records and data fields of the author file AT. In particular, each of the data record-structured files DSD1, . . . ,DSDn can be treated as an author file AT.

In the construction of documentation to be drawn up in the author file AT, a new data record is to be provided and, correspondingly, to be reserved for each chapter of the documentation, that is to say for each title and subtitle. The data records DS are subdivided into a multiplicity of data fields DF of which during construction a few are visible, e.g. the data field "TITLE" and the data field "USEFUL INFORMATION", but most are not visible to the creator.

In the present illustrative embodiment, when drawing up the documentation, the title of the first chapter was entered manually by the creator in the first data record—with the data record address ATDS1 which the user moreover does not see. Further, useful information belonging to this title was entered by the creator using the keyboard in the form of an item of text or graphic information "General" within the same data record.

The title of the next subchapter as well as associated useful information "History" were also entered by the creator using the keyboard. The data record Ds filled in this way has the data record address ATDS2.

The creator receives the title of the second subchapter from a list of contents of the data record-structured file DSDx, which list he gets displayed by selecting the data record-structured file DSDX in a "window" on the screen of the DP authoring system AUTS. Through corresponding marking of the desired chapter—as indicated in the figure by ringing the Chapter 1.2.—and after subsequent confirmation, the marked title is received, i.e. copied into the new data record with address ATDS3. Further—the creator cannot see this—the data record address DS-ADR of the marked chapter and the HTML address HTML-ADR of the data page SD, which is assigned to the data record with the address DSDx:003, is stored.

Through the above-explained taking of a title from one of the data record-structured files DSD1, . . . ,DSDn, the subchapters of the selected chapter are also implicitly taken into the documentation firstly to be drawn up or to be processed.

Moreover, instead of an explicitly entered item of useful information, a link address to a text or graphic file, e.g. one of the data record structure-free files TGD1, . . . ,TGDp may be put in. Further, already existing chapters within the author file AT may also be taken to other locations in the author file AT in the manner explained. In addition, a (direct) address of a data record structure-free file TGD may also be received, although a reference is not provided in this.

After the desired documentation has been prepared by the creator through manual entry and by referencing to already existing chapters, at least within a preliminary context, the author file AT is fed to the format generator device HTML-GEN. By the latter, starting with the first data record, that is to say at the data record address ATDS1 of the author file AT, a structured list of contents (cf. top of FIG. 4) is drawn up and those data records which are not yet in HTML format (in the following example the first two data records of the author file AT) are converted into this format. Further, a copy of the HTML page files generated is transmitted via the data transmission line DL to the data server device SERVER for storage there. The author file AT which has been drawn up is stored as a new data record-structured file DSDn+1 in the storage device MEM of the DP authoring system.

FIG. 4 illustrates the drawing up of a list of contents, as was prepared by the format generator device HTML-GEN in the case of a data record-structured file, e.g. DSDX, which was drawn up beforehand.

Available for the user to see is a list of contents, drawn up by the format generator device HTML-GEN, with index and title indications (at the upper left of the figure), the index being a multi-position index in order to be able to express a desired structuring level of the classification of the documentation. Into this visible list of contents, are also all the subchapters of a chapter which [lacuna] been integrated, that is to say taken, by referencing—as explained in conjunction with FIG. 3 regarding Chapter 1.2.

What the creator cannot see is the construction of register data records REG0, . . . ,REG2 which, in particular, log a logical sequence of page files SD1, . . . ,SDm belonging to a piece of documentation. This is intended, in particular, so that when displaying a particular page file SDy on a DP user system Dvx on navigation symbols NSY [lacuna] can be presented and activated by the viewer on their DP user system in order to make it possible to turn over (leaf through) to the logical next or previous page within the structure of the documentation. The navigation symbols NSY are intended in particular to allow the viewer on a DP user system to call up the next or previous page file in logical sequence, without needing not to activate the brouwser function which—as already mentioned in the introduction—accesses a page through the list of contents.

As navigation symbols NSY, a right arrow is indicated, which symbolizes turning over to the logically next page, and an up arrow is indicated, which symbolizes turning back to the previous page. The HTML address of the logically next page in the documentation and the HTML address of the logically preceding page are respectively stored associated with the navigation symbols NSY of a particular page.

For rapid determination of the logically next or preceding page address of a particular page, the register data records RG0, . . . ,RG2 are drawn up by the format generator device HTML-GEN. The first register data record RG0 has two records, in which the titles of the hierarchically top level (level 0), that is to say the main titles of the documentation in question, are stored. The register data record RG1 similarly contains the titles of the chapters located at the next highest hierarchical level (level 1), and the register data record REG2 contains the titles of the hierarchical level 2.

In addition to a data field for the title, the register data records REG0, . . . ,REG2 have other data fields, e.g. for the index allocated to the title, for the data record address DS-ADR of the data record DS belonging to the title in the DP authoring system AUTS and for the HTML address under which the page file SDy belonging to the title in question can be addressed.

In another first data field—if appropriate—the address of the register record in which the logically next title is stored is indicated. In another second data field—if appropriate—the address of the register record in which the logically preceding title is stored is indicated. The addresses indicated are thus used as a link to data records of the register data records RG0, . . . ,RG2.

On the basis of the hierarchical structure, indicated by way of example, of the list of contents SIV represented in the upper left-hand part of FIG. 4, and therefore of the documentation, the first chapter has the title "TITLE-A". The page file SDy assigned to this logically first data record of the data record-structured file DSDX is likewise the logically first page file of the documentation and can be addressed under the HTML address XB. The next title in logical sequence belongs to Chapter 1.1. and, because of the lower hierarchical level, is stored in the register data record RG1 (under address 10). The page file SD belonging to this title (Title-A1) can be reached under the HTML address XA.

The next chapter in logical sequence in the documentation carries the title "Title-A2" and has the Index 1.2. The title is thus, because it has the same hierarchical level as the one before it, stored in the register data record REG1 (under the address 11). The following title in logical sequence "Title-A2A" is put under the address 20 in the register data record REG2 (for the hierarchical level 2). The page file SD belonging to this title (Title-A2A) can be addressed under the HTML address XD. The next title in logical sequence can in turn be found in the same register data record REG2 under the address 21 (TITLE-A2B). The previous title in logical sequence (relative to title "TITLE-A2A") is to be found in the register data record REG1 under the address 11. If the register data records REG0, . . . ,REG2 are constructed in the same way, then the navigation symbols NSY with the corresponding HTML addresses for the logically subsequent or logically preceding page file, respectively, can be determined very quickly and straightforwardly and given to the page file SD in question. The HTML addresses of the logically subsequent and preceding page files are thus entered in the page in question and then sent as a component of it to the data server device SERVER.

In the present example, only one navigation symbol NSY for turning over to the logically next page file, whose HTML address is XA, is put in the page with the HTML address XB. There is no navigation symbol to the preceding page because the chapter represents the start of the documentation. In the page file SD with the HTML address XA, the HTML address XC is stored under the navigation symbol NSY to the subsequent page, and the HTML address XB to the preceding page. In order to avoid transmission of page files which are already stored in the data server device SERVER, but whose HTML addresses have been changed to address a logically next or preceding page file SD, the register data records REG0, . . . ,REG2 may be stored in the data server device SERVER, the HTML address of the logically next and preceding page files with respect to a page file in question being determined through a link from the register data records REG0, . . . ,REG2.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for generating a group of page files formatted in a page markup language for storage in a data server device of a data networking system through which the page files are addressable by a multiplicity of data processing user systems and are transferrable to the user systems, comprising the steps of:

drawing up a data record-structured author file on a data processing authoring system which is connectable to the data server device via a data transmission line, in which author file text and graphic information is editable within a respective data record and reference information identifying data records of data record-structured files which are addressable in the data processing authoring system is insertable;

sending the author file to a format generator device of the authoring system, by which a respective page file is generated in the page markup language from the data records of the author file and from the data records which belong to the data record-structured files and are marked by reference information;

generating a respective page markup language-specific link control address addressing the page file associated with the identified data record from reference information inserted in the data records;

storing the respective page markup language-specific link control address in the page file associated with the data record containing the reference information; and transmitting the generated page files that are provided with page markup language-specific link control addresses to the data server device via the data transmission line.

2. The method as claimed in claim 1, wherein reference information about other data records of data record-structured files which files are addressable in the authoring system is addable to data records of the data record-structured files which are addressable in the authoring system.

3. The method as claimed in claim 1, wherein reference information about other data records of the data record-structured author file is addable to data records of the data record-structured author file.

4. The method as claimed in claim 1, wherein the author file is a data record-structured file which is already addressed in the authoring system.

5. The method as claimed in claim 1, wherein an item of reference information about files structured free of data records which is addressable in the authoring system is addable.

6. The method as claimed in claim 1, wherein the information stored in data record-structured files is subdivided into information modules to which at least one individual structure address is assigned, wherein each information module is stored together with its individual structure address in a respective data record, and wherein an item of reference information about a data record of a reference file is added in that, by visualization of the structure addresses filed in the reference file, one of the structure addresses is selectable.

7. The method as claimed in claim 1, wherein when selecting a data record already stored in the data server device as a page file, a page markup language-specific link control address addressing this page file is generated and is temporarily stored in a data field of the data record holding the reference information.

8. The method as claimed in claim 1, wherein the structure address is one of an item of text information or an item of numerical information.

9. The method as claimed in claim 1, wherein a data record-structured file in the authoring system is addressable only if the page files assigned to data records thereof are already stored in the data server device, and wherein a page file is transmitted only if it is not yet stored or a change has been made to information content thereof, in particular of link control addresses.

10. The method as claimed in claim 1, wherein the stored page files are displayed in the user systems with navigation control fields which allow leafing through a group of page files to a logically next or preceding page file while avoiding activation of corresponding forward functions of a page access device.

* * * * *